United States Patent
Landry et al.

(10) Patent No.: US 12,045,574 B2
(45) Date of Patent: Jul. 23, 2024

(54) SYSTEMS AND METHODS FOR GENERATING INDICATIONS OF REAL-TIME COMMUNICATION SESSIONS

(71) Applicant: SHOPIFY INC., Ottawa (CA)

(72) Inventors: Christopher Landry, Woodstock (CA); Angela Chen, Arcadia, CA (US); Nancy Cao, Brooklyn, NY (US); Andrew Ni, Seattle, WA (US); Jacob Adolphe, Washington, DC (US); Joaquin Fuenzalida Nunez, San Diego, CA (US)

(73) Assignee: SHOPIFY INC., Ottawa (CA)

( * ) Notice: Subject to any disclaimer, the term of this patent is extended or adjusted under 35 U.S.C. 154(b) by 403 days.

(21) Appl. No.: 17/462,979

(22) Filed: Aug. 31, 2021

(65) Prior Publication Data

US 2023/0062177 A1    Mar. 2, 2023

(51) Int. Cl.
    *G06F 40/30*     (2020.01)
    *G06F 16/31*     (2019.01)
    *G06F 16/9535*   (2019.01)
    *H04L 67/50*     (2022.01)

(52) U.S. Cl.
    CPC .......... *G06F 40/30* (2020.01); *G06F 16/313* (2019.01); *G06F 16/9535* (2019.01); *H04L 67/535* (2022.05)

(58) Field of Classification Search
    USPC ..................................................... 704/1–504
    See application file for complete search history.

(56) References Cited

U.S. PATENT DOCUMENTS

| | | | | |
|---|---|---|---|---|
| 9,195,635 | B2 * | 11/2015 | Liu | G06F 40/131 |
| 10,210,157 | B2 * | 2/2019 | Dandapat | G06F 40/169 |
| 10,511,713 | B1 * | 12/2019 | Boutcher | H04M 3/2227 |
| 10,522,151 | B2 * | 12/2019 | Cartwright | H04M 3/56 |
| 10,642,889 | B2 * | 5/2020 | Reshef | G10L 15/04 |

(Continued)

FOREIGN PATENT DOCUMENTS

| | | | | |
|---|---|---|---|---|
| AU | 2022341038 A1 * | 2/2024 | | G06F 16/313 |
| CA | 3228869 A1 * | 3/2023 | | G06F 16/313 |

(Continued)

OTHER PUBLICATIONS

U.S. Patent and Trademark Office, Office Action for U.S. Appl. No. 17/462,754 dated Nov. 21, 2023.

(Continued)

*Primary Examiner* — Marcus T Riley
(74) *Attorney, Agent, or Firm* — Smart & Biggar LP

(57) ABSTRACT

Systems and methods are described for generating indications of real-time communication sessions. An ongoing communication session is monitored to identify a most recent subset of communications, the most recent subset of communications being defined by a sliding window. The most recent subset of communications is analysed to identify one or more relevant words, based on at least a user-specific relevancy criterion, the user-specific relevancy criterion being relevant to a user-specific topic associated with a given user profile. Responsive to identifying the one or more relevant words, an indication of the ongoing communication session is provided to a user device associated with the given user profile.

20 Claims, 7 Drawing Sheets

(56) References Cited

U.S. PATENT DOCUMENTS

| | | | |
|---|---|---|---|
| 11,934,432 B2* | 3/2024 | Landry | G06F 40/30 |
| 2018/0239822 A1* | 8/2018 | Reshef | G06F 40/35 |
| 2021/0264162 A1* | 8/2021 | Reece | G06V 40/174 |
| 2023/0062177 A1* | 3/2023 | Landry | G06F 16/313 |
| 2023/0068145 A1* | 3/2023 | Landry | G06F 16/3346 |

FOREIGN PATENT DOCUMENTS

| | | | | |
|---|---|---|---|---|
| WO | WO-2018208514 A1 * | 11/2018 | | G06F 16/3322 |
| WO | WO-2023028702 A1 * | 3/2023 | | G06F 16/313 |

OTHER PUBLICATIONS

Z. Wang, et al., "A Hybrid Document Feature Extraction Method Using Latent Dirichlet Allocation and Word2Vec", 2016 IEEE First International Conference on Data Science in Cyberspace (DSC), Changsha, China, 2016, pp. 98-103, doi:10. 1109/DSC.2016110. (year 2016).

* cited by examiner

SYSTEMS AND METHODS FOR GENERATING INDICATIONS OF REAL-TIME COMMUNICATION SESSIONS

FIELD

The present disclosure relates to systems and methods for generating indications of real-time communication sessions on a digital communication platform, in which indications are generated based on identification of relevant words extracted from the communication session in real-time.

BACKGROUND

A digital communication platform may support (or host) a plurality of concurrent communication sessions (including audio session, video session, text session, etc.) taking place in real-time. Such communication sessions are often assigned predefined labels by a human moderator or administrator. Such predefined labels are often descriptive of the planned topic of discussion, intended audience, etc.

A user on the digital communication platform may have the opportunity to participate in any one or more of the communication sessions. A user may decide whether to join a session based on the predefined label that has been assigned to that session. Accordingly, it is important that the label provides accurate and useful information.

SUMMARY

Existing technologies on typical communication platforms typically rely on a human moderator or administrator to assign and manage labels for individual communication sessions. For example, a human moderator may create a chat group and set a group name as the predefined label for the chat group. Typically, the predefined label cannot be changed or updated without manual intervention by the moderator or administrator (or in some cases by a session participant).

A problem arises when the topic of discussion in a communication session changes from that indicated by the predefined label, with the result that the predefined label is no longer useful for a user who is deciding whether or not to join in that session. Relying on a human to change the predefined label is impractical. This problem is exacerbated in the scenario where a communication session has many active communications (e.g., many communications are transmitted at high frequency), such as in the case of a real-time audio or video session, or even real-time text messaging sessions. In such a scenario, the topic of discussion can change quickly and a human moderator or administrator cannot realistically update the session label to match the speed of natural human conversations. Human moderators or administrators may anticipate this problem and try to address this problem by assigning a predefined label that is general enough to encompass possible diverging topics. However, this results in a label that is too vague to usefully distinguish one communication session from another.

Some technologies attempt to address this problem by automating generation of a collection of words (e.g., a word cloud) that represents the words used in the communications within the session. However, such an approach results in bloating of the collection of words and/or irrelevancy of words in the collection as the communication session increases in time duration and/or number of communications.

In various examples, the present disclosure describes systems and methods that enable generation of a dynamic label for a communication session, which uses a dynamically sized sliding window to extract relevant words. The extracted relevant words are analyzed in real-time or near real-time, to generate a dynamic collection of words that can be used as a dynamic label representing the real-time content of the communications in the communication session.

Examples of the present disclosure may address the problem of how to dynamically generate labels for communication sessions that are occurring in real-time, in a digital and/or online platform. Due to the real-time and rapid nature of digital communications, such a problem is not a trivial matter of automating regular human activity. Some examples of the present disclosure provide a technical solution that dynamically analyzes the content of the communication session and dynamically sizes a sliding window. The sliding window is used to define a subset of communications from the communication session that is used to extract relevant words for generating the dynamic label for the communication session. Dynamically adjusting the size of the sliding window provides the technical advantage that the amount of data that is analyzed for extracting relevant words is flexible and adapted to the content characteristics of the communication session (thus helping to avoid bloating or irrelevancy of the label).

Examples of the present disclosure may also address the problem of how to dynamically notify a user of a communication session that might be of interest to the user. Since there can be multiple real-time communication sessions simultaneously taking place on a digital communication platform, it is not realistic or even possible for a human user to monitor all communication sessions in order to identify a communication session covering a topic of interest. Even with the assistance of dynamically generated labels as disclosed herein, it is not a trivial task for a human user to monitor the ever-changing labels in real-time. Some examples of the present disclosure provide a technical solution that determines user-specific relevancy of words, and uses the user-specific relevancy to identify and notify the user of communication sessions that may be of interest. Further, not only is the user-specific relevancy determined in real-time, but also a user-specific relevancy dictionary (which is used to determine user-specific relevancy of words) may be updated in real-time to reflect the user's changing interests.

Thus, examples of the present disclosure provide technical improvements to digital communications, in particular how communication sessions are managed on a digital communication platform.

In an example aspect, the present disclosure describes a computer system including a processing unit configured to execute instructions to cause the system to: monitor an ongoing communication session to identify a most recent subset of communications, the most recent subset of communications being defined by a sliding window; analyze the most recent subset of communications to identify one or more relevant words, based on at least a user-specific relevancy criterion, the user-specific relevancy criterion being relevant to a user-specific topic associated with a given user profile; and responsive to identifying the one or more relevant words, provide an indication of the ongoing communication session to a user device associated with the given user profile.

In any of the preceding examples, the processing unit may be further configured to execute instructions to cause the system to determine the user-specific topic by: tracking online activity associated with the given user profile on one or more online platforms; identifying one or more words associated with the online activity; computing a respective metric for each respective identified word, wherein the metric represents a user engagement with each respective identified word; and determining the user-specific topic by ranking the one or more identified words based on the respective one or more computed metrics.

In any of the preceding examples, the processing unit may be further configured to execute instructions to cause the system to compute the respective metric for each respective identified word by: extracting, from the tracked online activity, a time duration associated with each respective identified word; and computing the respective metric using a weight value based on the time duration associated with each respective identified word.

In any of the preceding examples, the tracked online activity may include a plurality of types of online activity, and the processing unit may be further configured to execute instructions to cause the system to compute the respective metric for each respective identified word by: determining a weight for each of the plurality of types of online activity; and computing the respective metric using a weighted sum of all types of online activity associated with each respective identified word, wherein each type of online activity is weighted by the corresponding determined weight.

In any of the preceding examples, the processing unit may be further configured to execute instructions to track the online activity by: determining the online activity on the one or more online platforms is associated with the given user profile; and extracting data about the online activity from the one or more online platforms.

In any of the preceding examples, the user-specific relevancy criterion may be relevant to any of a plurality of user-specific topics associated with the given user profile, and the indication may be provided to the user device responsive to identifying one or more relevant words based on relevancy to any of the plurality of user-specific topics associated with the given user profile.

In any of the preceding examples, the processing unit may be further configured to execute instructions to cause the system to: generate and provide a label associated with the communication session, the label including at least one of the one or more relevant words.

In any of the preceding examples, the processing unit may be further configured to execute instructions to cause the system to: encode words in the most recent subset of communications into respective embedding vectors using a trained language model. The one or more relevant words may be identified based on semantic relevancy to the user-specific topic, and semantic relevancy to the user-specific topic may be determined using the respective embedding vectors.

In any of the preceding examples, the processing unit may be further configured to execute instructions to cause the system to identify the one or more relevant words based on the one or more relevancy words being associated with respective relevancy scores exceeding a predefined threshold. The relevancy scores may be determined using a relevancy dictionary that is selected based on the user-specific topic.

In any of the preceding examples, the sliding window may be a dynamically sized sliding window, and a size of the sliding window may be determined based on an identified content characteristic of the communication session.

In another example aspect, the present disclosure describes a method including: monitoring an ongoing communication session to identify a most recent subset of communications, the most recent subset of communications being defined by a sliding window; analyzing the most recent subset of communications to identify one or more relevant words, based on at least a user-specific relevancy criterion, the user-specific relevancy criterion being relevant to a user-specific topic associated with a given user profile; and responsive to identifying the one or more relevant words, providing an indication of the ongoing communication session to a user device associated with the given user profile.

In any of the preceding examples, the method may further include determining the user-specific topic by: tracking online activity associated with the given user profile on one or more online platforms; identifying one or more words associated with the online activity; computing a respective metric for each respective identified word, wherein the metric represents a user engagement with each respective identified word; and determining the user-specific topic by ranking the one or more identified words based on the respective one or more computed metrics.

In any of the preceding examples, the respective metric for each respective identified word may be computed by: extracting, from the tracked online activity, a time duration associated with each respective identified word; and computing the respective metric using a weight value based on the time duration associated with each respective identified word.

In any of the preceding examples, the tracked online activity may include a plurality of types of online activity, and the respective metric for each respective identified word may be computed by: determining a weight for each of the plurality of types of online activity; and computing the respective metric using a weighted sum of all types of online activity associated with each respective identified word, wherein each type of online activity is weighted by the corresponding determined weight.

In any of the preceding examples, the user-specific relevancy criterion may be relevant to any of a plurality of user-specific topics associated with the given user profile, and the indication may be provided to the user device responsive to identifying one or more relevant words based on relevancy to any of the plurality of user-specific topics associated with the given user profile.

In any of the preceding examples, the method may further include: generating and providing a label associated with the communication session, the label including at least one of the one or more relevant words.

In any of the preceding examples, the method may further include: encoding words in the most recent subset of communications into respective embedding vectors using a trained language model. The one or more relevant words may be identified based on semantic relevancy to the user-specific topic, and semantic relevancy to the user-specific topic is determined using the respective embedding vectors.

In any of the preceding examples, the one or more relevant words may be identified based on the one or more relevancy words being associated with respective relevancy scores exceeding a predefined threshold. The relevancy scores may be determined using a relevancy dictionary that is selected based on the user-specific topic.

In any of the preceding examples, the sliding window may be a dynamically sized sliding window, and a size of the sliding window may be determined based on an identified content characteristic of the communication session.

In another example aspect, the present disclosure describes a non-transitory computer readable medium having instructions encoded thereon. The instructions, when executed by a processing unit of a computer system, cause the computer system to: monitor an ongoing communication session to identify a most recent subset of communications, the most recent subset of communications being defined by a sliding window; analyze the most recent subset of communications to identify one or more relevant words, based on at least a user-specific relevancy criterion, the user-specific relevancy criterion being relevant to a user-specific topic associated with a given user profile; and responsive to identifying the one or more relevant words, provide an indication of the ongoing communication session to a user device associated with the given user profile.

In some examples the non-transitory computer readable medium may include instructions that further cause the computer system to perform any of the methods described above.

BRIEF DESCRIPTION OF THE DRAWINGS

Reference will now be made, by way of example, to the accompanying drawings which show example embodiments of the present application, and in which.

Similar reference numerals may have been used in different figures to denote similar components.

DESCRIPTION OF EXAMPLE EMBODIMENTS

Examples of the present disclosure are described in the context of a digital communication platform. It should be understood that the communications supported by the digital communication platform may be of any suitable format (e.g., audio, video, text, etc.) and multiple formats may be supported by the same digital communication platform. Although an example of the digital communication platform, this is not intended to be limiting.

In the context of the present disclosure, a communication session refers to a logical framework within which communications can be transmitted and received between a group of participants who belong to the session. Typically, the participants of a communication session can change throughout the duration of the session (e.g., new participants can join and existing participants can leave). A user who is not part of the communication session may not transmit or receive communications in the session, but may be able to transmit and receive communications (and possibly view a history of previous communications in the session) after joining the session (i.e., after becoming a participant in the session). A participant in a communication session may be solely a recipient of communications, without transmitting any communications.

Figure 1:
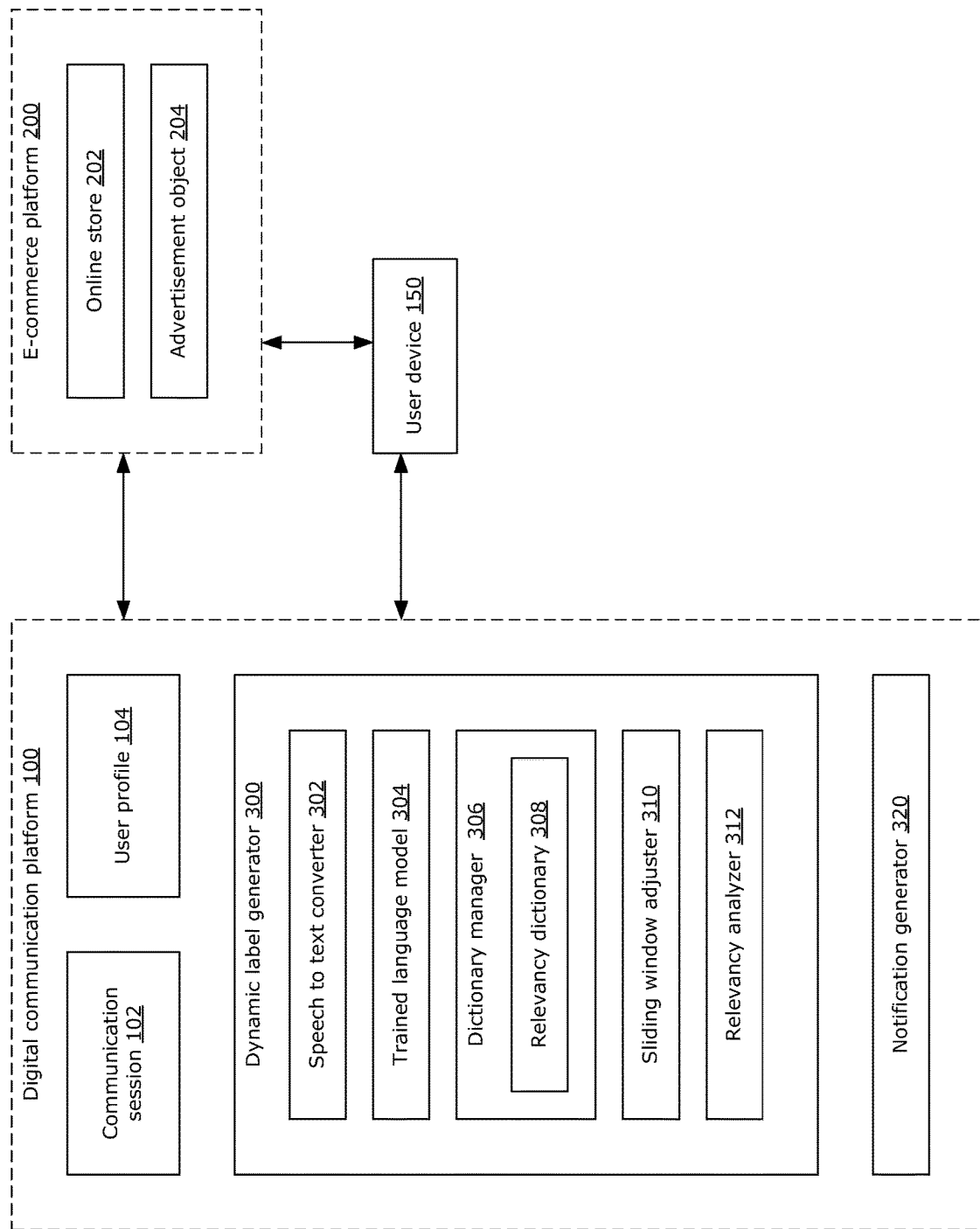
FIG. 1 is a block diagram of an example digital communication platform, in which examples described herein may be implemented.

FIG. 1 is a block diagram of an example digital communication platform 100, in accordance with some examples of the present disclosure. The digital communication platform 100 may be any online platform that supports communication sessions between groups of participants. In some examples, the digital communication platform 100 may not primarily be used for digital communications but may support communication sessions as a secondary function. For example, the digital communication platform 100 may have e-commerce as a primary function (i.e., may be an e-commerce platform) and may support communication sessions as a secondary function; for the purpose of the present disclosure, such a platform may be referred to as a digital communication platform 100.

In some examples, the digital communication platform 100 may cooperate with other online platforms to provide digital communication services to users of the other online platforms. For example, as shown in FIG. 1, the digital communication platform 100 may communicate with an e-commerce platform 200 over an online network. The digital communication platform 100 may cooperate with an e-commerce platform 200 to provide digital communication services to users of the e-commerce platform 200. In another example, the e-commerce platform 200 may cooperate with the digital communication platform 100 to enable users of the digital communication platform 100 to access services (e.g., make purchases at online stores 202, view advertisement objects 204, etc.) provided by the e-commerce platform 200. In some examples, the digital communication platform 100 may be wholly integrated into another online platform. Thus, it should be understood that the present disclosure is not intended to be limited by the example configuration of the digital communication platform 100 as shown in FIG. 1.

A user may access the digital communication platform 100 via a user device 150, for example over an online network. The user device 150 may be any suitable computing device having network communication capabilities, such as a desktop computer, a laptop, a tablet, a smartphone, a smart appliance, a network-connected vehicle, an Internet of Things (IoT) device, or any portable or non-portable computing device.

The digital communication platform 100 hosts one or more communication sessions 102. Only one communication session 102 is illustrated for simplicity, but there may be a plurality of communication sessions 102 hosted by the digital communication platform 100. In some examples, two or more communication sessions 102 may be grouped together in a common context. For example, multiple communication sessions 102 may be associated with a common conference, a common company, a common working group, etc. Each communication session 102 may be associated with one or more session attributes, such as format of communications (e.g., video, audio, text, or combination thereof), level of privacy (e.g., open to the public, limited to a particular context, by invitation only, etc.), maximum number of participants, session identifier (e.g., an alphanumeric identifier that is unique to each communication session 102 on the digital communication platform 100), associated context (e.g., a label indicating the communication session 102 is associated with a particular conference, company, working group, etc.), etc.

In particular, each communication session 102 may be associated with a predefined label, which may be assigned by a human administrator or moderator at the time the communication session 102 is created, or may be a default label assigned to the communication session 102. The predefined label may be relatively static (e.g., may be changed only manually). Additionally, as described further below, each communication session 102 may be associated with a dynamically generated label that may change in real-time, without manual intervention.

The digital communication platform 100 may store one or more user profiles 104, associated with respective one or more users of the digital communication platform 100. Only one user profile 104 is illustrated for simplicity, but there may be a plurality of user profiles 104 stored by the digital communication platform 100. A user profile 104 may store user-specific information, such as a user identifier (e.g., an alphanumeric identifier that is unique within the digital communication platform 100), historical activity of the user on the digital communication platform 100 (e.g., data about communication sessions 102 that the user has hosted/participated, historical searches for communication sessions 102 on the digital communication platform 100, etc.), preferred language, membership in any particular context (e.g., registered member of a particular conference, employee of a particular company, contributor to a particular working group, etc.), etc. In some examples, the user profile 104 may also store a user-specific topic (e.g., a topic of interest).

A user-specific topic may be a word or phrase that is manually inputted into the user profile 104 by the user associated with the user profile 104, for example. In some examples, the user-specific topic may, instead of being manually inputted, be automatically populated by the digital communication platform 100 based on the historical activity of the user on the digital platform 100.

For example, the digital communication platform 100 may track the time that a given user participates in various communication sessions 102 on the digital communication platform 100, and the topic of discussion in those communication sessions 102 (e.g., based on the topic indicated in the predefined label associated with each communication session 102, or based on relevant words included in a dynamically generated label associated with the communication session 102). The activity of the given user in the various communication sessions 102 may indicate that the topic of discussion is a user-specific topic of interest for the given user, depending on the user's activity. For example, if the user is an active participant (i.e., actively transmitting communications) about a given topic in a communication session 102, this may indicate that the given topic is a user-specific topic of interest for the user. In another example, the amount of time that the user is a participant (e.g., active or passive participant) in a communication session 102 about a given topic may be used as an indicator of the degree of interest. For example, the given topic may be considered a user-specific topic only if the user spends at least a threshold amount of time (e.g., at least 10 minutes) in a communication session 102 about the given topic. In another example, the given topic may be considered a user-specific topic if the user is an active participant for at least another threshold amount of time (e.g., at least 20 minutes) in a communication session 102 about the given topic, or if the user is a host or designated speaker in a communication session 102 about the given topic. In some examples, the digital communication platform 100 may track queries for a particular word by the user (e.g., tracking queries entered into a search functionality provided by the digital communication platform 100), and such queries may be aggregated with the user's participant history to determine the user-specific topic for the user.

In some examples, the digital communication platform 100 may access information about the user from other external online platforms (e.g., by performing data scraping, or by cross-referencing user profiles, etc.) to identify a user-specific topic. For example, the digital communication platform 100 may cross-reference a given user profile 104 on the digital communication platform 100 with another user profile on the other online platform (e.g., based on common user information such as a common email address, using cookies, using browser fingerprinting, based on data sharing between platforms, etc.), and thus identify online activity (e.g., search queries, page views, transmitted/viewed communications, online purchases, etc.) on other online platforms that is associated with a given user profile 104. Data about the online activity on the other online platform may be extracted (e.g., through data scraping of publicly available information, through user-permitted data sharing, etc.). Relevant word(s) associated with the online activity may be identified.

The online activity, whether on the digital communication platform 100 or on another online platform or both, may be aggregated to compute a metric representing user engagement with respective words (which may represent respective topics). The metric may be a weighted aggregate, where the time duration of the online activity associated with each respective word is used as a weight. Additionally or alternatively, different types of online activity may be weighted differently (e.g., online activity that requires active participation, such as being an active participant in a communication session 102 or entering a search query, may have greater weight than online activity that is more passive, such as only viewing a communication or a page). The computed metric may be used to rank the respective words, and a predefined number of highest-ranked words (e.g., top 3 or top 5 ranked words) may be identified as user-specific topics and entered into the user profile 104.

Other such techniques for determining a user-specific topic may be possible within the scope of the present disclosure.

A user associated with a user profile 104 may be a participant of a communication session 102. A user may log onto their user profile 104 on the digital communication platform 100, and may be uniquely identified in the communication session 102 using the user identifier associated with their user profile 104. However, a participant of a communication session 102 may not necessarily be associated with a user profile 104 (e.g., a participant may simply be anonymous or identified as a "guest"). Such an anonymous user may be identified in the communication session 102 by a randomly generated identifier that is assigned to the anonymous user (e.g., associated with the network connection that is established between the anonymous user's user device 150 and the digital communication platform 100). The randomly generated identifier may be persistent for the duration that the anonymous user is connected to the digital communication platform 100, or may be persistent only for the duration that the anonymous user is a participant in a given communication session 102. The randomly generated identifier may be sufficient to uniquely identify the anonymous user for the duration of the user's participation in the given communication session 102, but may not be used for tracking historical activity of the anonymous user on the digital communication platform 100.

Figure 2:
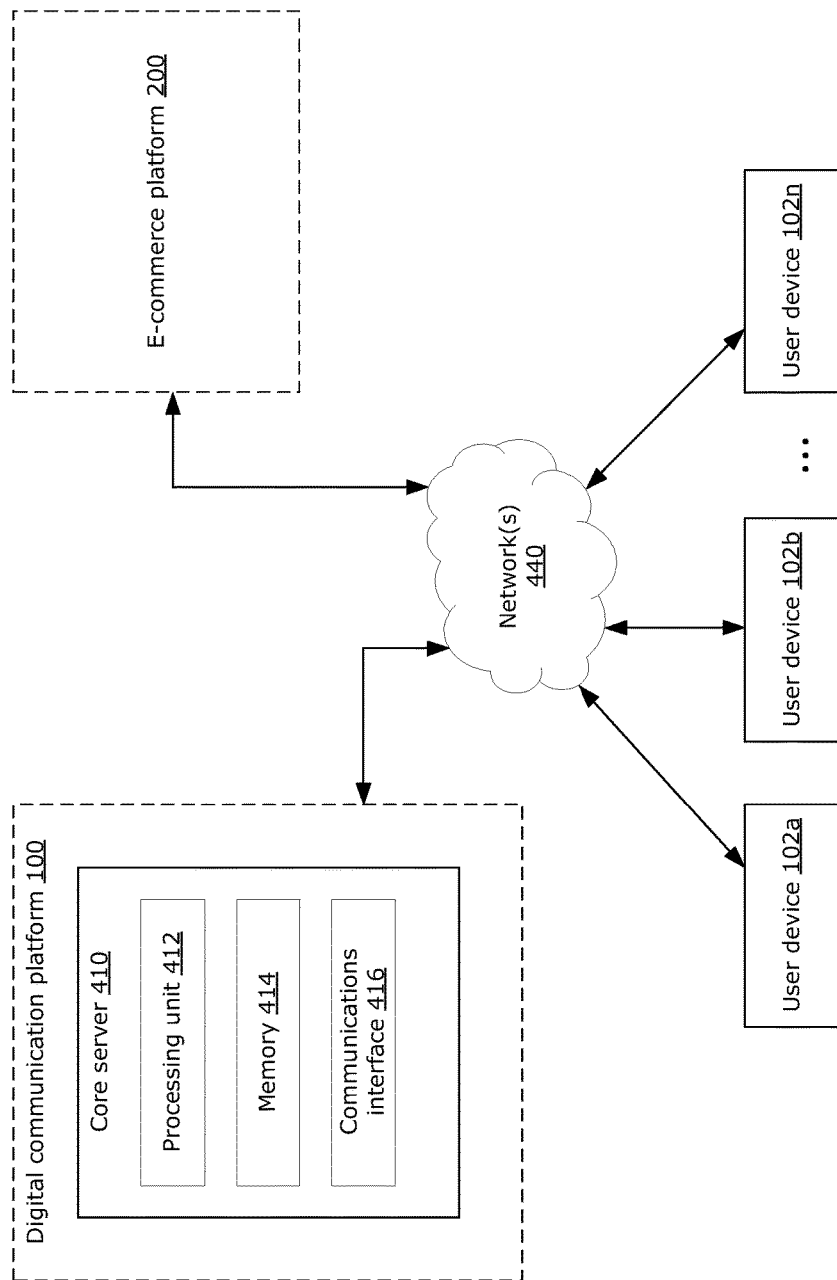
FIG. 2 is a block diagram illustrating an example hardware implementation of the digital communication platform of FIG. 1.

FIG. 2 illustrates an example hardware implementation of the digital communication platform 100. It should be noted that different components of the digital communication platform 100 may be implemented in separate hardware or software components, on a common hardware component or server or configured as a common (integrated) service or engine in the digital communication platform 100. In the example of FIG. 2, the digital communication platform 100 is depicted as being implemented using a single core server 410; however it should be understood that the digital communication platform 100 may be implemented using multiple servers (e.g., using a server cluster), or may be implemented using a virtual machine accessing a virtual pool of computing resources (e.g., as a cloud-based platform), among other possibilities.

The core server 410 includes a respective processing unit 412 (e.g., a microprocessor, graphical processing unit, digital signal processor or other computational element), a memory 414 (e.g., random access memory (RAM), read only memory (ROM), hard disk, optical disc, subscriber identity module (SIM) card, memory stick, secure digital (SD) memory card, and the like, and may include non-transitory or transient memory), and a communications interface 416 (e.g., transmitter, receiver and/or transceiver for wired and/or wireless communications). The memory 414 may store instructions that are executable by the processing unit 412, to implement functions and capabilities of the digital communication platform 100, including functions and capabilities disclosed herein (e.g., the example methods discussed herein), among others.

Users, using respective user devices 102a, 102b . . . 102n (generally referred to as user devices 102) may access the digital communication platform 100 via one or more networks 440 (e.g., wired and/or wireless networks, including a virtual private network (VPN), the Internet, and the like). Similarly, the digital communication platform 100 may be in communication with an e-commerce platform 200, as well as other online platforms and online resources (not shown), via the network(s) 440.

Although FIG. 2 illustrates an example hardware implementation of the digital communication platform 100, it should be understood that other implementations may be possible. For example, there may be greater or fewer numbers of servers, the digital communication platform 100 may be implemented in a distributed manner, or the memory 414 may be replaced with external storage or cloud-based storage, among other possible modifications.

Reference is again made to FIG. 1. The digital communication platform 100 includes a dynamic label generator 300, which dynamically generates and associates labels with respective communication sessions 102 in real-time or near real-time. In the present disclosure, operations that occur real-time or near real-time include computer operations that process data at the time (or within a short period of time, e.g., within 100 ms or within 1 s) that the data is generated. For example, real-time analysis of a communication session 102 may involve analysis of the content being transmitted/received during the communication session 102 as the content is transmitted/received by participants. In some examples, the dynamic label generator 300, instead of being a component of the digital communication platform 100, may be an external service that is provided to the digital communication platform 100.

In the example shown, the dynamic label generator 300 includes a plurality of modules, including a speech to text converter 302, a trained language module 304, a dictionary manager 306, a sliding window adjuster 310 and a relevancy analyzer 312. The modules may interact with each other, to enable the dynamic label generator 300 to analyze a communication session 102 in real-time or near real-time and generate a dynamic label for the communication session 102. It should be understood that these modules are illustrated as an example implementation of the dynamic label generator 300, and are not intended to be limiting. For example, functions that are described as being performed by any one module may be performed by a different module; there may be a greater or fewer number of modules belonging to the dynamic label generator 300; and/or functions described as being performed by any one module may instead be a general (i.e., not module-specific) function of the dynamic label generation 300.

In particular, the dynamic label generation 300, rather than analyzing all communications generated by participants during the communication session 102, uses a sliding window to analyze only a most recent subset of the communication session 102, as the basis for generating a dynamic label for the communication session 102. In particular, the sliding window is sized dynamically, meaning that the amount of communications contained in the subset that is analyzed may be varied, in response to the content characteristics of the communication session 102 in real-time or near real-time.

The speech to text converter 302 performs operations to convert audio communications of a communication session 102 to text. The speech to text converter 302 may perform speech to text conversion in real-time or near real-time, as audio communications are transmitted in the communication session 102. In the case where the communication session 102 is a video communication session 102, the speech to text converter 302 may first extract the audio component from the video communications, to obtain audio communications. Various real-time speech to text conversion algorithms (including automated real-time transcription algorithms) may be used to implement the speech to text converter 302. In some examples, the speech to text converter 302 may call on an application programming interface (API) to access a third-party speech to text conversion algorithm provided by a third-party service provider (e.g., a cloud-based service provider). Regardless of the specific implementation, the speech to text converter 302 serves to convert audio data from the communication session 102 into text data. If a communication session 102 is a text only communication session 102, the speech to text converter 302 may not be used (since the communications in the text only communication session 102 are already in text format). The text data generated by the speech to text converter 302 may be used by other modules of the dynamic label generator 300, as discussed below.

The trained language model 304 is a pre-trained neural network model that has been previously trained (e.g., using a human language corpus) to encode text into an embedding vector (i.e., a vectorized feature representation in a latent vector space) that numerically represents the semantic meaning of the text. In some examples, a preprocessor (not shown) may be used to first convert text data into a set of tokens, using any suitable tokenization technique. For example, each word in the text data may be converted to a respective token (e.g., the text data "What about this?" may be converted to the set of tokens [What], [about], [this] and [?]). In some examples, the preprocessor may perform stemming or lemmatization to reduce each token to represent a root word (e.g., the token [faster] may be reduced to the lemmatized token [fast]). Other such preprocessing techniques may be used to tokenize the text data. The trained language model 304 then encodes the tokenized text into embedding vectors that represent the semantic meaning of the text. In particular, the trained language model 304 may be trained to generate embedding vectors that represent the semantic meaning of each word in the tokenized text. The proximity of two embedding vectors to each other in the latent vector space represents the semantic similarity of the two words represented by the two embedding vectors. An example of the trained language model 304 may be the Bidirectional Encoder Representations from Transformers (BERT) language model, word2vec language model, or Global Vectors (GloVe) language model, among other possibilities.

The trained language model 304 may process text data on a word-by-word basis, in real-time or near real-time, as the text data is converted from audio communications by the speech to text converter 302, or as text communications are transmitted in the communication session 102. Alternatively, the trained language model 304 may process text data on a phrase-by-phrase or sentence-by-sentence basis, in real-time or near real-time, where each phrase or sentence may be demarcated by a punctuation mark. The embedding vectors that are generated by the trained language model 304 may be used by other modules (e.g., the relevancy analyzer 312) to determine relevancy of the words represented by the embedding vectors, for example.

In some examples, a clustering algorithm may be used to identify clusters of embedding vectors in the vector space, which represents word clusters. Using a semantic tree (e.g., a semantic tree that has been developed using Word Net or other lexical database, in which each node or leaf of the tree corresponds to a respective word), a word that semantically represents a given word cluster may be identified (e.g., a word that corresponds to a node in the semantic tree that is common to all words in the word cluster), and that word may be identified as the topic of the word cluster.

The dictionary manager 306 stores and manages one or more relevancy dictionaries 308. A relevancy dictionary 308 may be a resource (e.g., a lookup table, or hash table) that may be accessed (e.g., by the relevancy analyzer 312) to determine the relevancy of respective words. There may be different relevancy dictionaries 308 stored by the dictionary manager 306, where each relevancy dictionary 308 stores information specific to a particular language, a particular context, a particular user, etc. This means that the relevancy dictionaries 308 may have different scopes of coverage, and further that multiple relevancy dictionaries 308 may be applicable to a given communication session 102. For example, a relevancy dictionary 308 that is specific to a particular language may be applicable to all communication sessions 102 that use that particular language. Another relevancy dictionary 308 that is specific to a particular context (e.g., a particular industry, a particular company, a particular geographic region, a particular demographic, a particular conference, etc.) may be applicable to only communication sessions 102 in that context. If a communication session 102 falls within the scope of two or more contexts (e.g., within the context of a particular conference, in a particular geographic region), then respective two or more different relevancy dictionaries 308 may be applicable. Another relevancy dictionary 308 that is specific to a particular user (e.g., associated with a particular user profile 104 and/or a particular user identifier) may be applicable to only communication sessions 102 in which that particular user is a participant, or may be applicable to only communications transmitted by that particular user.

In some examples, a relevancy dictionary 308 may store each word associated with a respective relevancy score. A relevancy score may be a numerical representation of the probability that a given word, found in a communication transmitted in a communication session 102, is relevant to the topic being discussed in the communication session 102. For example, a relevancy score of zero may indicate the word is completely irrelevant to the topic; whereas a relevancy score of one may indicate the word is absolutely relevant to the topic. Since it is impossible for a relevancy dictionary 308 to include all possible words that might be used in a communication session 102, a relevancy dictionary 308 may be used to identify words that are irrelevant (e.g., having a relevancy score of zero), with all other words assumed to be relevant; or may be used to identify words that are relevant (e.g., having a nonzero positive relevancy score), with all other words assumed to be irrelevant.

Words and relevancy scores that are stored in a relevancy dictionary may be predetermined. For example, a language-specific relevancy dictionary 308 may store words that are considered to be irrelevant based on the particular language of the communication session 102 (e.g., common conjunctions or articles in that language may be irrelevant words). In another example, a context-specific relevancy dictionary 308 may store words that are considered to be irrelevant in a particular context (e.g., the name of a conference may be irrelevant in the context of communication sessions 102 that belong to that conference; the name of a company or the names of employees may be irrelevant in the context of communication sessions 102 within that company; or slang words may be considered irrelevant in the context of a particular geographic region or demographic). In another example, a context-specific relevancy dictionary 308 may store words that are considered to be relevant in a particular context (e.g., industry-specific jargon, abbreviations and acronyms that are nonsensical and/or irrelevant in general may be considered relevant in the context of a particular industry). In another example, a session-specific relevancy dictionary 308 may store words that are considered to be relevant to that particular communication session 102 (e.g., if the communication session 102 has a predefined label indicating a topic, then all words that are semantically related to that topic may be considered relevant to that session). In another example, a user-specific relevancy dictionary 308 may store words that are considered to be irrelevant for a particular user (e.g., due to user-specific vocabulary choices, such as statistical overrepresentation of certain words or phrases in communications by a particular user). Relevancy scores may be determined empirically (e.g., based on manual rating of words used in a particular language or context), or may be determined automatically by a NLP algorithm (e.g., based on semantic relevancy to a topic of the communication session 102, for example based on semantic word clustering), among other possibilities.

In some examples, words and relevancy scores stored in a relevancy dictionary 308 may be updated dynamically. For example, a session-specific relevancy dictionary 308 may be updated dynamically to store the names of the current participants in a communication session 102 (i.e., add/remove names as participants join/leave the communication session 102), in order to indicate the participants' names as irrelevant words.

The sliding window adjuster 310 performs operations to dynamically adjust the size of the sliding window that is used to analyze a communication session 102. The sliding window defines a most recent subset of communications from the communication session 102 that is to be analyzed by the relevancy analyzer 312. The sliding window may define the segment of the communication session 120 to include in the most recent subset of communications, based on a number of words to consider (e.g., the most recent 100 words or the most recent 50 words in the communication session 102) or a time duration to consider (e.g., the most recent five minutes or the most recent one minute of communications in the communication session 102).

The size of the sliding window may be determined based on the content characteristic of the communication session 102. In the present disclosure, the content characteristic of a communication session 102 refers to characteristics of the content of the communications in the communication session 102, such as the spoken rate of words, rate of change (i.e., turn-taking) of active participants, gaps in speech, and information density and/or level of entropy in content. Content characteristic does not refer to transmission or channel characteristics, such as audio levels, bandwidth, or latency.

The sliding window adjuster 310 may compute one or more content characteristics of the communication session 102 and adjust the size of the sliding window in accordance with the computed content characteristic. In general the size of the sliding window may be dynamically adjusted such that the segment of the communication session 120 that is considered to be the most recent subset of communications to be analyzed is intended to capture a target measure of content (e.g., a target number of words, a target number of topics, a target number of active participants, etc.).

For example, a computed content characteristic may be a rate at which words or phrases are communicated in the communication session 102 (e.g., words per minute). The word rate may be computed by parsing the text data (e.g., text communications, or audio communications that have been converted to text) into words, and computing the number of words per minute. In another example, the word rate may be computed by using signal processing to identify pauses or gaps (i.e., a time duration with no audio data) in audio communication, and computing the number of gaps per minute (e.g., based on the assumption that each gap demarks a phrase). The sliding window may be a temporal window that is adjusted inversely proportional to the rate at which words or phrases are communicated (i.e., the time duration that defines the most recent subset of communications is decreased with increasing rate). This adjustment may be made such that the most recent subset of communications corresponds to a target number of words (e.g., a target range of 50-70 words).

In another example, a computed content characteristic may be a rate at which the active participants (i.e., participants who are transmitting communications in the communication session 102) change (e.g., the rate at which different participants are contributing to the communication session 102). The sliding window may be a temporal window that is adjusted inversely proportional to the rate at which the active participants change (i.e., the time duration that defines the most recent subset of communications is decreased with increasing rate). This adjustment may be made such that the most recent subset of communications corresponds to a target number of active participants (e.g., a target range of 1-3 active participants).

In another example, a computed content characteristic may be the number of relevant words identified in the most recent subset of communications (e.g., the number of relevant words determined using the relevancy analyzer 312, using the current size of the sliding window). The sliding window may be a word count window that is adjusted to maintain the number of relevant words within a defined numerical range (i.e., if the number of relevant words found in the most recent subset of communications is higher than the defined numerical range, the size of the sliding window is decreased). This adjustment may be made such that the most recent subset of communications corresponds to a target number of relevant words (e.g., a target range of 15-20 relevant words).

In another example, a computed content characteristic may be the topic discussed in the communication session 102. For example, a topic in the communication session 102 may be identified using the trained language model 304 (e.g., based on word clusters, as discussed above). The sliding window may be a temporal or word count window that is adjusted to limit the most recent subset of communications to only the most recent topic in the communication session 102.

In another example, a computed content characteristic may be the information density contained in the communications in the communication session 102. Information density of human communications may be computed based on the concept of entropy as defined in information theory. For example, the entropy in a sentence may be computed using the formula:

$$H(X) = -\sum_{i=1}^{n} P(x_i) \log P(x_i)$$

where $H(X)$ is the entropy of a sentence X, where $x_i$ is the i-th word in the sentence X, and where $P(x_i)$ is the probability of occurrence of the word $x_1$. The value of $P(x_i)$ may be approximated as the inverse of the relevancy score of the word $x_i$ (i.e., the higher the relevancy score, the lower the probability of occurrence). The higher the entropy $H(X)$, the greater the amount of information contained in the sentence X. Thus, after parsing the communications of the communication session 102 into sentences and applying the relevancy dictionary 308, the entropy of each sentence may be computed. The sliding window may be a temporal or word count window that is adjusted to maintain the average entropy of the most recent subset of communications to a target range (e.g., a target range of 0.5-1.0). Other measures of information density may be used to similarly adjust the size of the sliding window.

The sliding window adjuster 310 may adjust the sliding window for each communication session 102 individually and independently of each other. Further, the sliding window adjuster 310 may use different techniques for determining the size of the sliding window for different communication sessions 102. In some examples, an administrator or moderation of the communication session 102 may have the ability to select the technique by which the sliding window adjuster 310 determines the size of the sliding window. For example, for a communication session 102 that is in the context of an industry-specific conference, it may be expected that topics in the communication session 102 would stay relevant to the particular industry. In such a scenario, the sliding window adjuster 310 may dynamically determine the size of the sliding window so that the number of industry-specific relevant words (e.g., determined using an industry-specific relevancy dictionary 308) in the subset of communications defined by the sliding window is within a target range (e.g., 10-20 industry-specific relevant words). In another example, for a communication session 102 that is in the context of a casual chat group, it may be expected that topics in the communication session 102 can vary widely and unexpectedly. In such a scenario, the sliding window adjuster 310 may use the word clustering to identify the most recent topic of discussion and determine the size of the sliding window so that the subset of communications defined by the sliding window corresponds to communications relevant to the most recent topic of discussion.

As should be appreciated from the above discussion, the sliding window adjuster 310 may be used to dynamically determine the size of the sliding window at various points in the processing of the communications. For example, the sliding window adjuster 310 may adjust the size of the sliding window based on the change of active participant in the communication session 102 (i.e., the sliding window adjuster 310 may adjust the size of the sliding window with minimal processing of the communications). In another example, the sliding window adjuster 310 may adjust the size of the sliding window based on gaps in audio communications (i.e., the sliding window adjuster 310 may adjust the size of the sliding window prior to conversion of speech to text). In another example, the sliding window adjuster 310 may adjust the size of the sliding window based on the rate/number of words/phrases (i.e., the sliding window adjuster 310 may adjust the size of the sliding window prior to processing by the trained language model 304 and prior to relevancy analysis). In another example, the sliding window adjuster 310 may adjust the size of the sliding window based on the number of relevant words, based on a change of topic, or based on information density, which may require more extensive processing of the communications.

In some examples, the sliding window adjuster 310 may implement an approach to dynamically adjust the size of the sliding window, where the content characteristic can be computed with little or no processing of the communications in the communication session 102 (e.g., where the size of the sliding window is adjusted based on change of active participants, or based on gaps in audio communications). This may be advantageous because the size of the sliding window can be dynamically determined with less use of computing resources. Further processing (e.g., speech to text conversion, execution of the trained language model 304, etc.) of the communications may then be performed on only the segment of the communication session 102 that has been defined by the sliding window. Thus, resource-intensive processing may be limited to a smaller set of data. Such an approach may be particularly advantageous in scenarios where there are a large number of simultaneous communication sessions 102 on the digital communication platform 100 (e.g., 100 communication sessions 102 or more), each of which require dynamic sizing of the sliding window.

In other examples, the sliding window adjuster 310 may implement an approach that requires more processing of the communications (e.g., where the size of the sliding window is adjusted based on the rate/number of words/phrases, or based on the number of relevant words), with the advantage that the size of the sliding window may be more precisely tailored to the content characteristics of each communication session 102 (which may result in the dynamic label being a more accurate and precise representation of the communication session 102).

The relevancy analyzer 312 performs operations to determine the relevancy of words communicated in a communication session 102, based on one or more relevancy criteria. In particular, the relevancy analyzer 312 identifies one or more relevant words from the most recent subset of communications (defined by the sliding window), which are used to dynamically generate a label for the communication session 102. The relevancy analyzer 312 may communicate with other modules of the dynamic label generator 300. For example, the relevancy analyzer 312 may process text data (e.g., converted from the most recent subset of audio communications, using the speech to text converter 302; or the most recent subset of text communications) to identify the one or more relevant words. In another example, the relevancy analyzer 312 may process embedding vectors (e.g., generated by the trained language model 314) to identify the one or more relevant words. The relevancy analyzer 312 may also refer to one or more relevancy dictionaries 308 managed by the dictionary manage 306, to identify the one or more relevant words. The relevancy analyzer 312 may also implement various statistical techniques to identify the one or more relevant words. The relevancy analyzer 312 may use various relevancy criteria to determine the relevancy of words in the subset of communications defined by the sliding window.

In an example, the relevancy analyzer 312 may determine relevant words based on semantic relevancy to a topic (e.g., a predefined topic, or a current topic) of the communication session 102. Using the embedding vectors generated by the trained language model 304, the relevancy analyzer 312 may compute the Euclidean distance of each embedding vector to a topic embedding vector representing a topic of the communication session 102 (e.g., an embedding vector representing a predefined topic of the communication session 102, or an embedding vector representing the current topic of the communication session 102). The smaller the Euclidean distance between a given embedding vector and the topic embedding vector, the greater the semantic relevancy to the topic and hence the greater the relevancy of the word represented by the given embedding vector. The relevancy analyzer 312 may identify a predefined number of relevant words (e.g., top 10 or top 20 semantically relevant words) in this way.

In some examples, a current topic of the communication session 102 may be identified through word clustering, as discussed above. In such examples, the word cluster may be determined to be a topic of the communication session 102 only if the size of the word cluster (e.g., number of words in the word cluster) exceeds a predefined threshold (e.g., over 20 words or over 40 words in the word cluster).

In some examples, the relevancy analyzer 312 may identify a user-specific topic (e.g., a topic of interest or topic of expertise) indicated in a user profile 104 of a given participant in the communication session 102. It may be expected that if a given participant has particular user-specific topic(s) in the user profile 104, then words used by that given participant related to the particular user-specific topic(s) would have greater relevancy (e.g., the given participant may have expertise in the topic). Thus, communications by the given participant may be analyzed for semantic relevancy to a user-specific topic (e.g., based on similarity of embedding vectors, as discussed above) indicated in the user profile 104 associated with the given participant. A predefined number of words that have the highest semantic relevancy to the user-specific topic (e.g., the top 5 or top 10 words) may be identified as relevant words.

In another example, the relevancy analyzer 312 may use one or more relevancy dictionaries 308 to determine the relevancy score for each word in the most recent subset of communications. Words having a relevancy score exceeding a predefined threshold (e.g., over a threshold of 0.7) may be identified as relevant words. The relevancy analyzer 312 may identify a predefined number of relevant words in this way (e.g., 10 or 20 words with the highest relevancy scores).

In some examples, the relevancy analyzer 312 may use one or more relevancy dictionaries 308 to determine irrelevant words in the most recent subset of communications.

Then, from the remaining words, a predefined number of words that occur the greatest number of times (e.g., the top 10 or top 20 occurring words) may be identified as relevant words.

In another example, after using a relevancy dictionary 308 to identify irrelevant words in the most recent subset of communications, relevancy scores may be determined for the remaining words, using a different relevancy dictionary 308. As mentioned above, there may be multiple relevancy dictionaries 308 that apply to a communication session 102. For example, consider a given communication session 102 that is being conducted in a given language (which may be a content characteristic associated with the communication session 102, and which may be explicitly indicated in the session attributes or may be identified using suitable NLP techniques), is in a given context (e.g., session attributes indicate the communication session 102 is part of a given conference), and has a given participant who is assigned the role of host/speaker. For this given communication session 102, three different relevancy dictionaries 308 may be applicable: a first relevancy dictionary 308 that is specific to the given language (e.g., containing words that are considered irrelevant in the given language); a second relevancy dictionary 308 that is specific to the given context (e.g., containing words associated with relevancy scores specific to the given conference); and a third relevancy dictionary 308 that is specific to the given participant (e.g., containing words that are considered irrelevant when used by the specific participant, for example words that are statistically overrepresented in communications by the specific participant, compared to communications by other participants).

In some examples, the relevancy analyzer 312 may use statistical analysis to determine relevant words in the most recent subset of communications. For example, the relevancy analyzer 312 may analyze the words captured in respective sliding windows across multiple communication sessions 102 (e.g., across all communication sessions 102 belonging to a common context, such as all communication sessions 102 belonging to the same conference, or belonging to the same company). The relevancy analyzer 312 may identify statistically common words (e.g., having a high number of occurrences, or having a high probability in a probability distribution) as irrelevant words in the common context. The relevancy analyzer 312 may exclude the irrelevant words and identify relevant words from the remaining words in the most recent subset of communications, as discussed above.

After having determined one or more relevant words in the most recent subset of communications, using any of the techniques described above, the dynamic label generator 300 may generate and provide the dynamic label to be associated with the communication session 102, where the dynamic label includes at least one of the determined relevant words. The generated dynamic label may be outputted to a user device 150, for example.

Figure 3:
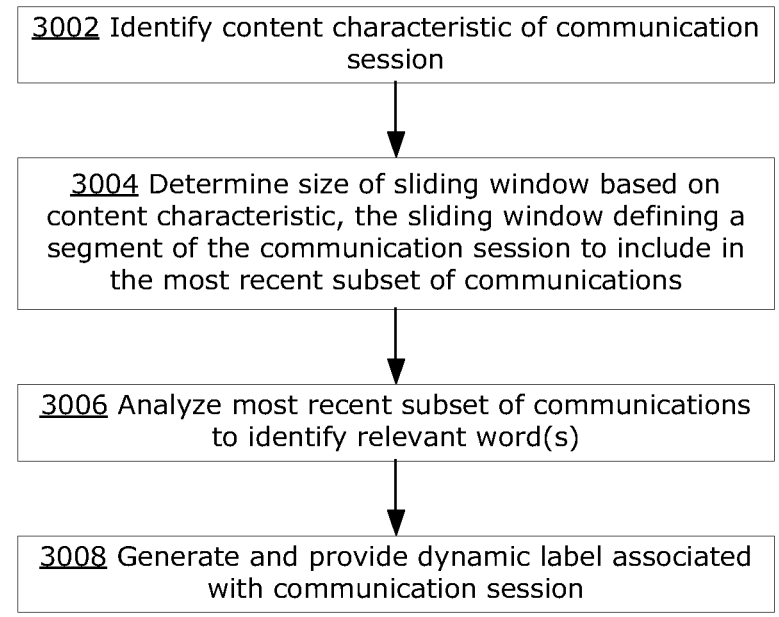
FIG. 3 is a flowchart illustrating an example method for generating a dynamic label for a real-time communication session.

FIG. 3 is a flowchart illustrating an example method 3000 that may be performed by the digital communication platform 100, for example using the dynamic label generator 300, to dynamically generate a label for a communication session 102 hosted on the digital communication platform 100.

At an operation 3002, a current, real-time communication session 102 is monitored to identify a content characteristic of the communication session 102. As previously mentioned, a content characteristic of a communication session 102 may include characteristics such as the rate of words or phrases communicated, rate of change of active participants, number of relevant words, topic of discussion, gaps in speech, or information density of the communications, among others.

Modules of the dynamic label generator 300, such as the speech to text converter 302 and the trained language model 304, may be used to identify the content characteristic, as discussed above.

At an operation 3004, the size of the sliding window is determined based on the content characteristic of the communication session 102. The sliding window defines the segment of the communication session to include in the most recent subset of communications, which will be analyzed for relevant words. The sliding window may be a temporal window, which defines the segment of the communication session to include in the most recent subset of communications in terms of a time duration (e.g., the most recent one minute or the most recent five minutes). The sliding window may be a word count window, which defines the segment of the communication session to include in the most recent subset of communications in terms of a number of words (e.g., the most recent 100 words).

The sliding window adjuster 310 may perform operations as discussed above to dynamically determine the size of the sliding window based on the content characteristic. For example, the sliding window adjuster 310 may determine the size of the sliding window to be inversely proportional to the rate at which words or phrases are communicated. In another example, the sliding window adjuster 310 may determine the size of the sliding window to be inversely proportional to the rate of change of active participants in the communication session 102. In another example, the sliding window adjuster 310 may determine the size of the sliding window such that the number of relevant words in the most recent subset of communications is within a target range. In another example, the sliding window adjuster 310 may determine the size of the sliding window to limit the most recent subset of communications to the most recent topic in the communication session 102. In another example, the sliding window adjuster 310 may determine the size of the sliding window such that the average entropy (or other measure of information density) of the most recent subset of communications is within a target range.

Figure 4A:
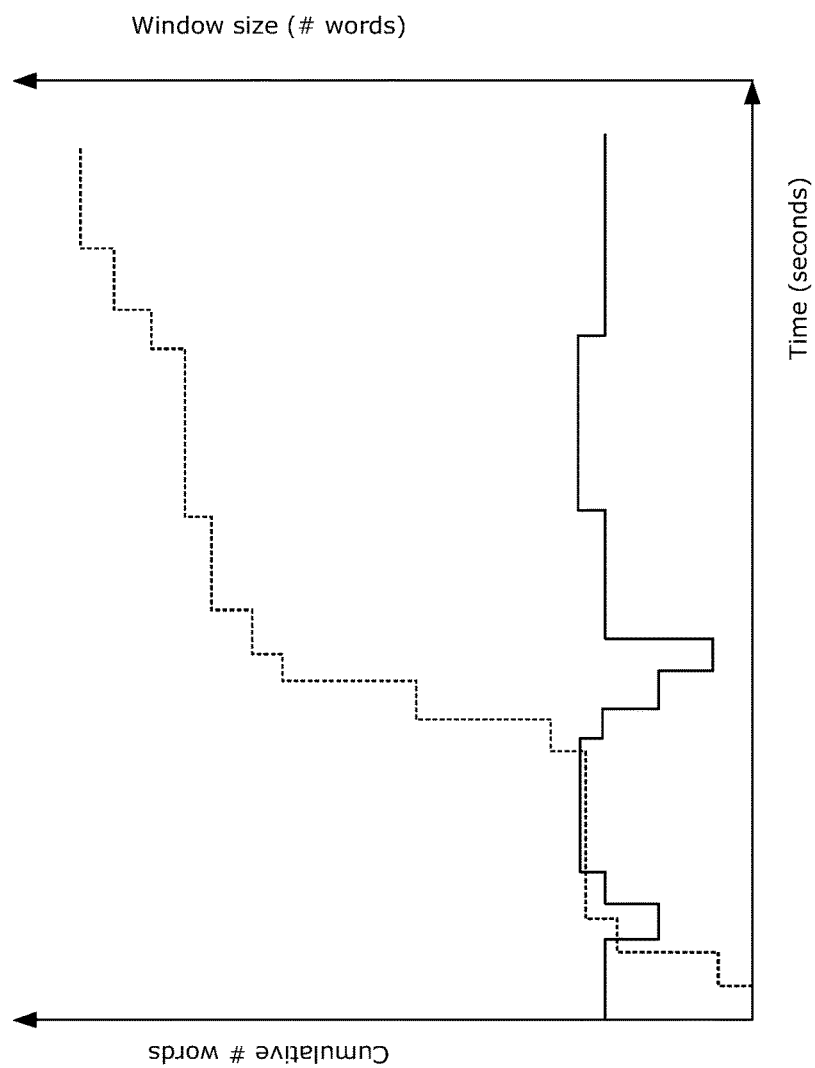
FIGS. 4A and 4B are charts illustrating examples of how the size of a sliding window may be dynamically adjusted in the example method of FIG. 3.

FIG. 4A is a chart that illustrates a simple example in which the size of the sliding window is dynamically adjusted to be inversely proportional to the rate at which words are communicated in the communication session 102. In this simple example, the cumulative number of words in the communication session 102 over time is indicated by a dashed line. The sliding window in this example defines a number of words to include in the most recent subset of communications, and the size of the sliding window over time is indicated by a solid line. As shown in FIG. 4A, as the rate of words increases, the size of the sliding window decreases, and vice versa.

Figure 4B:
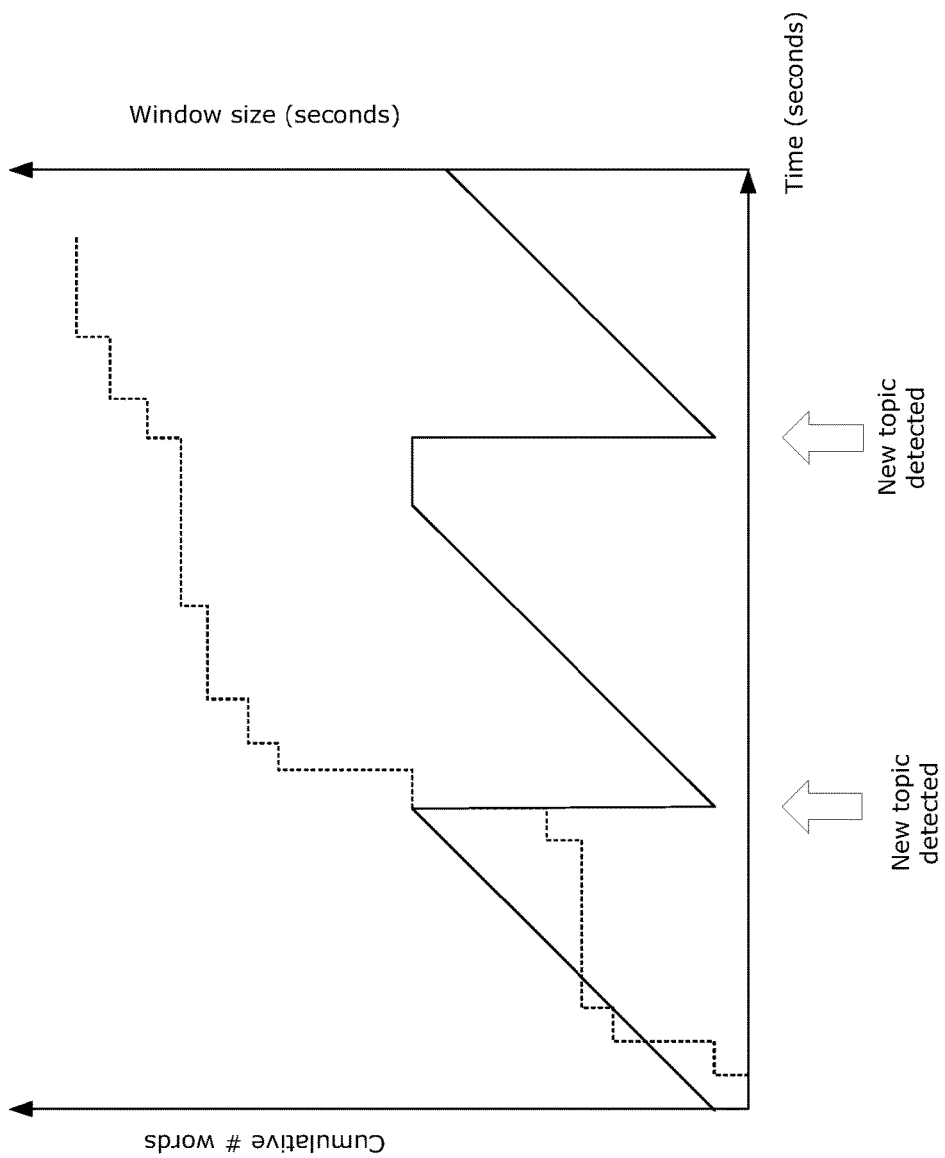

FIG. 4B is a chart that illustrates another simple example in which the size of the sliding window is dynamically adjusted to limit the most recent subset of communications to only the most recent topic in the communication session 102. Again, the cumulative number of words in the communication session 102 over time is indicated by a dashed line. The sliding window in this example defines a time duration of the most recent subset of communications, and the size of the sliding window over time is indicated by a solid line. A new topic of discussion is detected (e.g., through the use of the trained language model 304 and word clustering techniques) at certain times as indicated. As shown in FIG. 4B, the size of the sliding window is decreased when a new topic is detected (to exclude older communications that do not relate to the new topic) and steadily increases until another new topic is detected. Further, in this example, it can be seen that the size of the sliding window is capped at a maximum time duration.

Returning to FIG. 3, at an operation 3006, the most recent subset of communications (as defined by the sliding window) is analyzed to identify one or more relevant words based on one or more relevancy criteria. As discussed above, the relevancy analyzer 312 may identify relevant word(s) in the most recent subset of communications using various relevancy criteria such as semantic relevancy, relevancy score, statistical occurrence, etc.

In an example, the relevancy analyzer 312 may identify a predefined number of words that are most semantically relevant to a predefined topic or a current topic in the communication session 102. In another example, the relevancy analyzer 312 may identify a predefined number of words that are most semantically relevant to a user-specific topic indicated in the user profile 104 of a participant in the communication session 102. In another example, the relevancy analyzer 312 may identify a predefined number of words that have the highest relevancy score, based on one or more relevancy dictionaries 308 that are applicable to the communication session 102. In another example, the relevancy analyzer 312 may identify a predefined number of words that have the highest statistical occurrence in the most recent subset of communications, after excluding irrelevant words (e.g., using a relevancy dictionary 308, or by excluding words that are statistically common across multiple communication sessions 102).

At an operation 3008, a dynamic label is generated and associated with the communication session 102. The dynamic label includes at least one word selected from the relevant word(s) identified at the operation 3006. The generated dynamic label may be provided as output to a user device 150, for example.

For example, the dynamic label may be generated by first ranking the relevant word(s) based on the relevancy criteria (e.g., ranked based on semantic relevancy to the predefined or current topic of the communication session 102, ranked based on relevancy score, or ranked based on highest statistical occurrence). A maximum number of top-ranked relevant words, which may be fewer than the number of relevant words identified at the operation 3006, may then be selected to include in the dynamic label. For example, if 20 relevant words are identified, only five or only one top-ranked relevant word may be selected to include in the dynamic label.

In some examples, in addition to or instead of using ranking to select the words to be included in the dynamic label, a relevancy threshold may be used. Only relevant word(s) that pass the relevancy threshold (which may be defined based on the relevancy criteria, such as a threshold relevancy score, a threshold semantic similarity to a topic, or a threshold number of occurrences) may be selected for inclusion in the dynamic label.

The dynamic label may be generated as a visual representation of the selected word(s). For example, the dynamic label may be a visual list of the selected word(s) or a word cloud (e.g., where the size of each word in the word cloud indicates the relative relevancy ranking of the respective word) that may be displayed by the user device 150. In another example, the dynamic label may be generated as an audio representation of the selected word(s). For example, a text to speech converter may be used to generate an audio output listing the selected word(s), which may be outputted by the user device 150.

In some examples, the dynamic label may be provided to supplement a predefined label that was assigned to the communication session 102 (e.g., by a human administrator or moderator). In other examples, the dynamic label may replace the predefined label.

The method 3000 may be performed continuously and in real-time (i.e., concurrent with the ongoing communication session 102). In particular, subsequent to generating the dynamic label, the communication session 102 may continue to be monitored. If a change in the content characteristic is identified (e.g., a change in the rate of communications, a change in topic, a change in information density, etc.) then the size of the sliding window is adjusted based on the changed content characteristic (e.g., similar to the operation 3004) and the most recent subset of communications is updated in accordance with the sliding window. The relevancy analysis and dynamic label generating is also repeated, using the updated most recent subset of communications, such that an updated dynamic label is generated and provided. These operations may be performed in real-time with the ongoing communication session, such that the size of the sliding window may be continuously updated dynamically, and the dynamic label is also updated continuously in real-time.

Notably, as the sliding window is updated (e.g., the size of the sliding window is updated, and the sliding window is moved forward to the most recent communications), the segment of the communication session 102 that is included in the most recent subset of communications is updated. The relevancy analysis may result in an updated set of identified relevant word(s), and updated relevancy ranking. Accordingly, the word(s) selected to be included in the dynamic label may be updated. In this way, the dynamic label associated with the communication session 102 may continuously reflect the most up-to-date discussion in the communication session 102, without requiring manual intervention.

A user may use the dynamic label associated with a given communication session 102 as a basis for deciding whether or not to join in as a participant in the communication session 102. In some scenarios, there may be multiple concurrent communication sessions 102, each associated with a respective ever-changing dynamic label. The digital communication platform 100 may use a notification generator 320 (as shown in FIG. 1) to generate real-time notifications (to be provided to the user via the user's user device 150), to notify the user when a dynamic label includes a word that is likely to interest the user.

It should be understood that, given the fast-changing nature of real-time digital communications and the fact that there can be many (e.g., dozens or hundreds) of concurrent communication sessions 102, how to generate the dynamic label is a technical problem that cannot be impractically solved manually. As well, dynamic determination of the size of the sliding window requires processing of real-time data (e.g., determining the rate of communications, computing entropy, etc.) to provide the technical solution in real-time. Further, some examples make use of a trained language model 304, which is a type of artificial neural network that requires computer implementation.

Figure 5:
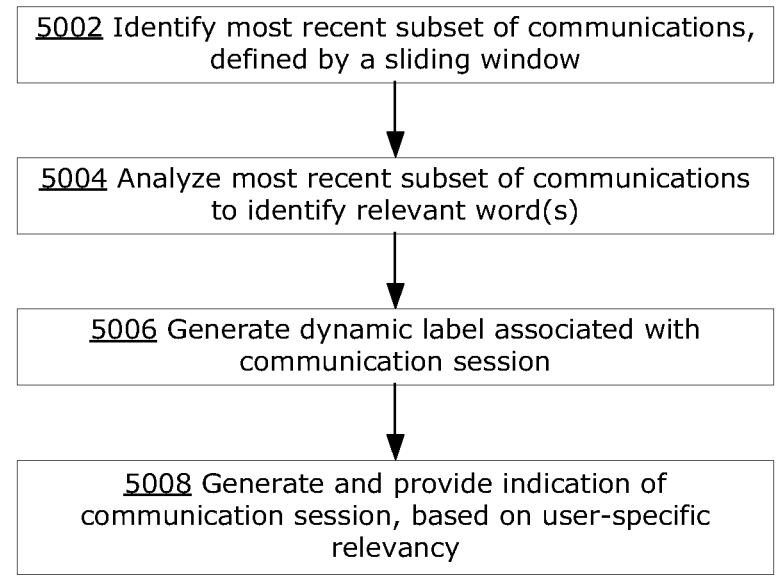
FIG. 5 is a flowchart illustrating an example method for generating an indication of a communication session, based on a user-specific relevancy criterion.

FIG. 5 is a flowchart illustrating an example method 5000 that may be performed by the digital communication platform 100, for example using the notification generator 320, to generate and provide an indication of a communication session 102 to a user device 150.

At an operation 5002, a current, real-time communication session 102 is monitored to identify a most recent subset of communications, defined by a sliding window. The sliding window may be a dynamically sized sliding window. For example, operations 3002 and 3004 described above may be performed to dynamically determine the size of the sliding window.

At an operation 5004, the most recent subset of communications (as defined by the sliding window) is analyzed to identify one or more relevant words based on one or more relevancy criteria. The operation 5004 may be similar to the operation 3006.

In some examples, the operation 5004 may include at least one relevancy criterion that is user-specific. For example, a relevancy criterion may be relevancy to a user-specific topic (e.g., a topic of interest) associated with a given user profile 104. It may be noted that a user profile 104 may include a plurality of user-specific topics. The operation 5004 may identify any relevant words in the most recent subset of communications that is relevant to any of the user-specific topics.

In addition to the relevancy criteria described above with reference to the operation 3006, a user-specific relevancy criterion may be semantic relevancy to a user-specific topic indicated in the user profile 104. For example, the trained language model 304 may be used to generate word embedding vectors that represent respective words in the most recent subset of communications. Topic embedding vectors may be similarly generated to represent each user-specific topic indicated in the user profile 104. Then, using Euclidean distance (or other measure of similarity between vectors), the similarity (and hence semantic relevancy) between the topic embedding vectors and the word embedding vectors may be determined. In this way, words that are semantically relevant to any user-specific topic may be identified from the most recent subset of communications.

Another user-specific relevancy criterion may be a relevancy score exceeding a predefined threshold, where the relevancy score is determined using a relevancy dictionary 308 that is selected based on the user-specific topic. For example, if the user-specific topic indicates interest in a particular context-specific topic (e.g., a topic in a specific industry), then the corresponding context-specific relevancy dictionary 308 may be used to determine the relevancy score for the words in the most recent subset of communications.

Thus, the relevant words that are identified at the operation 5004 may include words that are specifically relevant to the user-specific topic identified in the user profile 104 (in addition to relevant words that are identified using other relevancy criteria). In other examples, identification of the relevant words may not consider any user-specific relevancy criterion.

At an operation 5006, a dynamic label associated with the communication session 102 is generated. The dynamic label includes at least one word selected from the relevant word(s) identified at the operation 5004. The generated dynamic label may be provided as output to a user device 150, for example. The operation 5006 may be similar to the operation 3008 described above.

Optionally, if a user-specific relevancy criterion was used to identify the relevant words at the operation 5004, the word(s) that are selected for inclusion in the dynamic label may include word(s) that are selected based on the user-specific relevancy criterion (e.g., based on relevancy to the user-specific topic). For example, the relevant words identified at the operation 5004 may be ranked by relevancy to any user-specific topic indicated in the user profile 104, and a predefined number of top-ranked words may be selected to include in the dynamic label. In this way, the dynamic label may be tailored to the user-specific topics indicated in the user profile 104 (e.g., tailored to the user's topics of interest). In other examples, the dynamic label may not be tailored to the user-specific topic.

At an operation 5008, an indication of the communication session 102 is generated, based on the user-specific relevancy criterion. The indication may be provided (e.g., as a push notification) to the user device 150 associated with the user profile 104. The indication may be similar to the dynamic label generated at the operation 5006 (e.g., the indication may be a visual representation, such as a word cloud, or an audio output).

The user-specific relevancy criterion may be, as discussed above, semantic relevancy to a user-specific topic indicated in the user profile 104, or a relevancy score that is above a predefined threshold, where the relevancy score is determined using a relevancy dictionary 308 that is selected based on the user-specific topic. The user-specific relevancy criterion may be applied to the relevant words identified at the operation 5004, or to the selected words included in the dynamic label at the operation 5006, regardless of whether the user-specific relevancy criterion was used at the operations 5004 or 5006. Using the user-specific relevancy criterion, it may be determined whether the communication session 102 is relevant to the user-specific topic indicated in the user profile 104 (and thus whether the communication session 102 is likely to be of interest to the user associated with the user profile 104). When the user-specific relevancy criterion is satisfied (e.g., the identified relevant words in the most recent subset of communications in the communication session 102 have a relevancy score above the predefined threshold, based on a relevancy dictionary 308 that is selected according to the user-specific topic), the indication is generated and provided to the user device 150 associated with the user profile 104.

The method 5000 may be used across multiple concurrent communication sessions 102, to identify and notify a user of any communication session 102 (among all concurrent communication sessions 102) that may be of interest to the user. In some examples, the method 5000 may be used to monitor for usage of words that are relevant for a moderator (e.g., use of inappropriate language), and to notify the moderator of the communication session 102 in which such words have been recently used in communications.

In some examples, the method 5000 may not include generation of the dynamic label (i.e., at the operation 5006). The method 5000 may be used to generate and provide indication of the communication session 102 (i.e., at the operation 5008), based on the user-specific relevancy criterion, without generating the dynamic label associated with the communication session 102.

It should be understood that, similar to the method 3000, the method 5000 addresses a technical problem using a real-time technical solution. Considering the fast-changing nature of online digital communications, and the fact that there can be a large number of concurrent communication sessions 102 on the digital communication platform 100, a manual approach to identify communication sessions 102 of interest would not be practical or possible.

As previously mentioned, in some examples a relevancy dictionary 308 may be used to determine relevancy scores for words in the most recent subset of communications, in order to identify relevant words. Accordingly, it may be important to automatically detect if a relevancy dictionary 308, which is currently being used for a given communication session 102, is no longer applicable. For example, a first relevancy dictionary 308 may have been selected to be used for determining relevancy for a given communication session 102, based on a particular context of the communication session 102. However, over time the communications in the communication session 102 may drift away from the particular context, so that the first relevancy dictionary 308 may no longer be suitable. For example, consider a communication session 102 that is part of a conference for the oil and gas industry. A first industry-specific relevancy dictionary 308 (e.g., containing relevancy scores for words relevant to the oil and gas industry) may have been selected to identify relevant words in the communication session 102. However, the discussion within the communication session 102 may drift to outside of that industry-specific context (e.g., discussions may drift to environmental concerns, and continue drifting to discussions of renewable energy). The digital communication platform 100 may perform operations (e.g., using the dynamic label generator 300, in particular the dictionary manager 306) to automatically replace the first relevancy dictionary 308 with a second relevancy dictionary 308 that contains relevancy scores for words relevant to the new topic of discussion, namely renewable energy.

Figure 6:
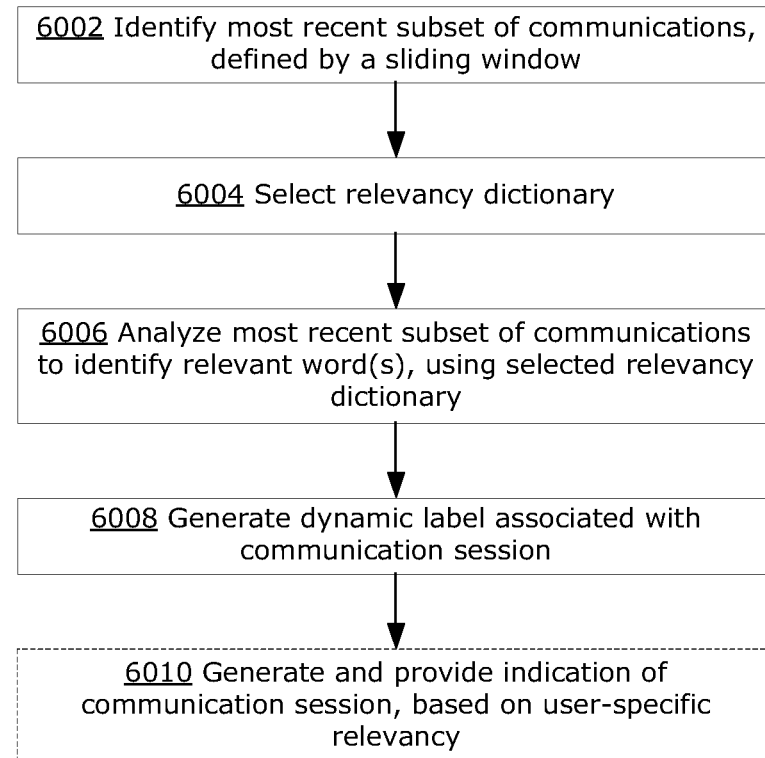
FIG. 6 is a flowchart illustrating an example method for selecting a relevancy dictionary.

FIG. 6 is a flowchart illustrating an example method 6000 that may be performed by the digital communication platform 100, for example using the dynamic label generator 300, in particular the dictionary manager 306, to select a relevancy dictionary 308 for determining relevancy of words in a communication session 102.

At an operation 6002, a current, real-time communication session 102 is monitored to identify a most recent subset of communications, defined by a sliding window. The sliding window may be a dynamically sized sliding window. For example, operations 3002 and 3004 described above may be performed to dynamically determine the size of the sliding window.

At an operation 6004, a relevancy dictionary 308 is selected from among a plurality of available relevancy dictionaries 308.

The relevancy dictionary 308 may be selected by replacing a first relevancy dictionary 308 that is currently being used with a second relevancy dictionary 308. The replacement of the first relevancy dictionary 308 with the second relevancy dictionary 308 may be in response to a determination that the first relevancy dictionary 308 is no longer suitable and the second relevancy dictionary 308 is more suitable.

For example, if most or all of the words (e.g., more than 80% or more than 90% of the words) in the most recent subset of communications are found to be irrelevant (e.g., having low relevancy scores in the first relevancy dictionary 308, or not found in the first relevancy dictionary 308 and the first relevancy dictionary 308 stores words considered to be relevant) using the first relevancy dictionary 308, then the first relevancy dictionary 308 may be considered unsuitable. In particular, the first relevancy dictionary 308 may be considered to be unsuitable only if most or all of the words in the most recent subset of communications are found to be irrelevant for at least a predefined time duration (e.g., for at least 5 minutes or at least 2 minutes). The second relevancy dictionary 308 may be identified from the plurality of available relevancy dictionaries 308 by identifying the relevancy dictionary 308 that gives the highest relevancy score to the words in the most recent subset of communications.

In another example, the relevancy dictionary 308 may be selected at the operation 6004 based on the participants in the communication session 102. For example, as participants join/leave the communication session 102, corresponding user-specific relevancy dictionaries 308 may be selected/unselected for use with the communication session 102.

It should be understood that more than one relevancy dictionary 308 may be selected for a given communication session 102, as previously discussed.

At an operation 6006, the most recent subset of communications (as defined by the sliding window) is analyzed to identify one or more relevant words using the selected relevancy dictionary 308, for example as discussed above with reference to the operation 3006.

At an operation 6008, a dynamic label associated with the communication session 102 is generated. The dynamic label includes at least one word selected from the relevant word(s) identified at the operation 6006. The generated dynamic label may be provided as output to a user device 150, for example. The operation 6008 may be similar to the operation 3008 described above.

Optionally, at an operation 6010, an indication of the communication session 102 is generated, based on a user-specific relevancy criterion (e.g., if a relevancy dictionary 308 was selected based on a user-specific topic indicated in a user profile 104). The indication may be provided (e.g., as a push notification) to the user device 150, as discussed above with reference to the operation 5008.

It should be understood that, similar to the methods 3000 and 5000, the method 6000 addresses a technical problem using a real-time technical solution, which may not be practical or possible to perform manually.

Although the methods 3000, 5000 and 6000 have been described separately, it should be understood that the methods 3000, 5000 and/or 6000 may be used in combination. For example, the size of the sliding window for a communication session 102 may be determined dynamically (e.g., as described in the method 3000), a relevancy dictionary 308 may be selected (e.g., as described in the method 6000) to identify relevant words in the most recent subset of communications defined by the sliding window, and an indication of the communication session 102 may be generated based on a user-specific relevancy criterion (e.g., as described in the method 5000). Other combinations of the methods 3000, 5000 and/or 6000 may be possible.

In some examples, when an indication of a communication session 102 is generated and provided to a user device 150 (e.g., based on a user-specific relevancy criterion), a portion of the communication session 102 may also be stored and optionally provided to the user device 150. For example, a portion of the communication session 102 (e.g., a portion that is 10 seconds in length) preceding the time when the indication is generated may be stored and optionally pushed to the user device 150, to provide context to a user. In some examples, the portion of the communication session 102 may be stored as text data, and may be included in a visual indication provided to the user device 150. This may provide the user with more information about the communication session 102, to enable the user to decide whether or not to participate in the communication session 102.

In some examples, two communication sessions 102 that have overlapping dynamic labels (e.g., having dynamic labels that include one or more relevant words in common) may be dynamically merged together by the digital communication platform 100.

In some examples, if the dynamic label associated with a communication session 102 differs significantly from a predefined label associated with the communication session 102, an administrator, moderator or a main participant (e.g., main speaker) of the communication session 102 may be notified (e.g., a notification may be provided to the user device 150 associated with the administrator, moderator or main participant). For example, if the dynamic label does not include any words that are semantically relevant to the predefined label, the dynamic label may be considered to differ significantly from the predefined label, and the administrator, moderator or main participant of the communication session 102 may be notified. This notification may be provided in real-time or near real-time (e.g., as soon as the dynamic label differs significantly from the predefined label, or if the dynamic label does not include any words that are semantically relevant to the predefined label for a predetermined period of time), to enable the administrator, moderator or main participant to take appropriate actions (e.g., to redirect the communication session 102 back to the topic indicated in the predefined label).

In some examples, the digital communication platform 100 may communicate with an e-commerce platform 200, as shown in FIG. 1. For example, relevant words identified in a most recent subset of communications in a communication session 102 may be communicated to the e-commerce platform 200. The e-commerce platform 200 may use the identified relevant words to identify advertisement objects 204 (e.g., advertisement objects 204 that contain the relevant words, or that describe products semantically relevant to the relevant words) that may be provided (e.g., displayed in or beside) in association with the communication session 102. For example, the e-commerce platform 200 may provide the identified advertisement objects 204 to the digital communication platform 100, and the digital communication platform 100 may insert advertisement objects 204 into the communication session 102.

In some examples, the identified relevant words may be used by the e-commerce platform 200 to identify online stores 202 that may be relevant (e.g., online stores 202 that contain the relevant words in the store name or store profile, or that sell products that are semantically relevant to the relevant words). The e-commerce platform 200 may generate notifications to the merchants of the identified online stores 202, to indicate that there are possibly discussions about the online store 202 and/or its products in a communication session 102 on the digital communication platform 100.

It should be understood that similar forms of information sharing between the digital communication platform 100 and the e-commerce platform 200 may take place (possibly with consent of the participants in the communication session 102).

Although the present disclosure describes methods and processes with operations (e.g., steps) in a certain order, one or more operations of the methods and processes may be omitted or altered as appropriate. One or more operations may take place in an order other than that in which they are described, as appropriate.

Although the present disclosure is described, at least in part, in terms of methods, a person of ordinary skill in the art will understand that the present disclosure is also directed to the various components for performing at least some of the aspects and features of the described methods, be it by way of hardware components, software or any combination of the two. Accordingly, the technical solution of the present disclosure may be embodied in the form of a software product. A suitable software product may be stored in a pre-recorded storage device or other similar non-volatile or non-transitory computer readable medium, including DVDs, CD-ROMs, USB flash disk, a removable hard disk, or other storage media, for example. The software product includes instructions tangibly stored thereon that enable a processing device (e.g., a personal computer, a server, or a network device) to execute examples of the methods disclosed herein.

The present disclosure may be embodied in other specific forms without departing from the subject matter of the claims. The described example embodiments are to be considered in all respects as being only illustrative and not restrictive. Selected features from one or more of the above-described embodiments may be combined to create alternative embodiments not explicitly described, features suitable for such combinations being understood within the scope of this disclosure.

All values and sub-ranges within disclosed ranges are also disclosed. Also, although the systems, devices and processes disclosed and shown herein may comprise a specific number of elements/components, the systems, devices and assemblies could be modified to include additional or fewer of such elements/components. For example, although any of the elements/components disclosed may be referenced as being singular, the embodiments disclosed herein could be modified to include a plurality of such elements/components. The subject matter described herein intends to cover and embrace all suitable changes in technology.

The invention claimed is:

1. A computer system comprising:
a processor configured to execute instructions to cause the system to:
monitor an ongoing communication session to identify a content characteristic of the ongoing communication session;
adjust a size of a sliding window based on the content characteristic of the ongoing communication session, wherein the size of the sliding window is dynamically adjusted to maintain the content characteristic of a most recent subset of communications, defined by the sliding window, to be within a target range;
analyze the most recent subset of communications to identify one or more relevant words, based on at least a user-specific relevancy criterion, the user-specific relevancy criterion being relevant to a user-specific topic associated with a given user profile; and
responsive to identifying the one or more relevant words, provide an indication of the ongoing communication session to a user device associated with the given user profile.

2. The computer system of claim 1, wherein the processor is further configured to execute instructions to cause the system to determine the user-specific topic by:
tracking online activity associated with the given user profile on one or more online platforms;
identifying one or more words associated with the online activity;
computing a respective metric for each respective identified word, wherein the respective metric represents a user engagement with each respective identified word; and
determining the user-specific topic by ranking the one or more identified words based on the respective computed metrics.

3. The computer system of claim 2, wherein the processor is further configured to execute instructions to cause the system to compute the respective metric for each respective identified word by:
extracting, from the tracked online activity, a time duration associated with each respective identified word; and
computing the respective metric using a weight value based on the time duration associated with each respective identified word.

4. The computer system of claim 2, wherein the tracked online activity includes a plurality of types of online activity, and wherein the processor is further configured to execute instructions to cause the system to compute the respective metric for each respective identified word by:
determining a weight for each of the plurality of types of online activity; and
computing the respective metric using a weighted sum of all types of online activity associated with each respective identified word, wherein each type of online activity is weighted by a corresponding determined weight.

5. The computer system of claim 2, wherein the processor is further configured to execute instructions to track the online activity by:
determining the online activity on the one or more online platforms is associated with the given user profile; and
extracting data about the online activity from the one or more online platforms.

6. The computer system of claim 1, wherein the user-specific relevancy criterion is relevant to any of a plurality of user-specific topics associated with the given user profile, and wherein the indication is provided to the user device responsive to identifying one or more relevant words based on relevancy to any of the plurality of user-specific topics associated with the given user profile.

7. The computer system of claim 1, wherein the processor is further configured to execute instructions to cause the system to:
generate and provide a label associated with the ongoing communication session, the label including at least one of the one or more relevant words.

8. The computer system of claim 1, wherein the processor is further configured to execute instructions to cause the system to:
encode words in the most recent subset of communications into respective embedding vectors using a trained language model;
wherein the one or more relevant words are identified based on semantic relevancy to the user-specific topic, and semantic relevancy to the user-specific topic is determined using the respective embedding vectors.

9. The computer system of claim 1, wherein the processor is further configured to execute instructions to cause the system to identify the one or more relevant words based on the one or more relevant words being associated with respective relevancy scores exceeding a predefined threshold, wherein the respective relevancy scores are determined using a relevancy dictionary that is selected based on the user-specific topic.

10. A method comprising:
monitoring an ongoing communication session to identify a content characteristic of the ongoing communication session;
adjusting a size of a sliding window based on the content characteristic of the ongoing communication session, wherein the size of the sliding window is dynamically adjusted to maintain the content characteristic of a most recent subset of communications, defined by the sliding window, to be within a target range;
analyzing the most recent subset of communications to identify one or more relevant words, based on at least a user-specific relevancy criterion, the user-specific relevancy criterion being relevant to a user-specific topic associated with a given user profile; and
responsive to identifying the one or more relevant words, providing an indication of the ongoing communication session to a user device associated with the given user profile.

11. The method of claim 10, further comprising determining the user-specific topic by:
tracking online activity associated with the given user profile on one or more online platforms;
identifying one or more words associated with the online activity;
computing a respective metric for each respective identified word, wherein the respective metric represents a user engagement with each respective identified word; and
determining the user-specific topic by ranking the one or more identified words based on the respective computed metrics.

12. The method of claim 11, wherein the respective metric for each respective identified word is computed by:
extracting, from the tracked online activity, a time duration associated with each respective identified word; and
computing the respective metric using a weight value based on the time duration associated with each respective identified word.

13. The method of claim 11, wherein the tracked online activity includes a plurality of types of online activity, and wherein the respective metric for each respective identified word is computed by:
determining a weight for each of the plurality of types of online activity; and
computing the respective metric using a weighted sum of all types of online activity associated with each respective identified word, wherein each type of online activity is weighted by a corresponding determined weight.

14. The method of claim 10, wherein the user-specific relevancy criterion is relevant to any of a plurality of user-specific topics associated with the given user profile, and wherein the indication is provided to the user device responsive to identifying one or more relevant words based on relevancy to any of the plurality of user-specific topics associated with the given user profile.

15. The method of claim 10, further comprising:
generating and providing a label associated with the ongoing communication session, the label including at least one of the one or more relevant words.

16. The method of claim 10, further comprising:
encoding words in the most recent subset of communications into respective embedding vectors using a trained language model;
wherein the one or more relevant words are identified based on semantic relevancy to the user-specific topic, and semantic relevancy to the user-specific topic is determined using the respective embedding vectors.

17. The method of claim 10, wherein the one or more relevant words are identified based on the one or more relevant words being associated with respective relevancy scores exceeding a predefined threshold, wherein respective the relevancy scores are determined using a relevancy dictionary that is selected based on the user-specific topic.

18. A non-transitory computer readable medium having instructions encoded thereon, wherein the instructions, when executed by a processing unit of a computer system, cause the computer system to:
- monitor an ongoing communication session to identify a content characteristic of the ongoing communication session;
- adjust a size of a sliding window based on the content characteristic of the ongoing communication session, wherein the size of the sliding window is dynamically adjusted to maintain the content characteristic of a most recent subset of communication, defined by the sliding window, to be within a target range;
- analyze the most recent subset of communications to identify one or more relevant words, based on at least a user-specific relevancy criterion, the user-specific relevancy criterion being relevant to a user-specific topic associated with a given user profile; and
- responsive to identifying the one or more relevant words, provide an indication of the ongoing communication session to a user device associated with the given user profile.

19. The computer system of claim 1, wherein the content characteristic of the ongoing communication session is:
- a rate at which words are communicated in the ongoing communication session, and wherein the size of the sliding window is dynamically adjusted to maintain a number of words in the most recent subset of communications to be within a target numerical range;
- a number of active participants in the ongoing communication session, and wherein the size of the sliding window is dynamically adjusted to maintain the number of active participants in the most recent subset of communications to be within a target numerical range;
- a number of relevant words identified in the most recent subset of communications, and wherein the size of the sliding window is dynamically adjusted to maintain the number of relevant words in the most recent subset of communications to be within a target numerical range;
- a number of topics of the ongoing communication session, and wherein the size of the sliding window is dynamically adjusted to limit the most recent subset of communications to a target number of topics; or
- an average entropy of information communicated in the most recent subset of communications, and wherein the size of the sliding window is dynamically adjusted to maintain the average entropy in the most recent subset of communications to be within a target range.

20. The method of claim 10, wherein the content characteristic of the communication ongoing session is:
- a rate at which words are communicated in the ongoing communication session, and wherein the size of the sliding window is dynamically adjusted to maintain a number of words in the most recent subset of communications to be within a target numerical range;
- a number of active participants in the ongoing communication session, and wherein the size of the sliding window is dynamically adjusted to maintain the number of active participants in the most recent subset of communications to be within a target numerical range;
- a number of relevant words identified in the most recent subset of communications, and wherein the size of the sliding window is dynamically adjusted to maintain the number of relevant words in the most recent subset of communications to be within a target numerical range;
- a number of topics of the ongoing communication session, and wherein the size of the sliding window is dynamically adjusted to limit the most recent subset of communications to a target number of topics; or
- an average entropy of information communicated in the most recent subset of communications, and wherein the size of the sliding window is dynamically adjusted to maintain the average entropy in the most recent subset of communications to be within a target range.

\* \* \* \* \*